United States Patent [19]
Chattha et al.

[11] Patent Number: 5,922,294
[45] Date of Patent: *Jul. 13, 1999

[54] HIGH SURFACE AREA, THERMALLY STABILIZED TITANIA AUTOMOTIVE CATALYST SUPPORT

[75] Inventors: Mohinder S. Chattha, Northville; Clifford Norman Montreuil, Inkster, both of Mich.

[73] Assignee: Ford Global Technologies, Inc., Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,070

[22] Filed: Mar. 10, 1997

[51] Int. Cl.$^6$ .............................. B01J 21/04; B01J 21/06; C01B 21/00

[52] U.S. Cl. .................................. 423/213.5; 423/213.2; 502/351; 502/355; 502/439

[58] Field of Search .................................. 502/351, 170, 502/325, 330, 350, 355, 439; 423/213.5, 213.2

[56] References Cited

U.S. PATENT DOCUMENTS 3,873,469   3/1975   Foster et al. .................... 252/455 R Primary Examiner—Michael Lewis
Assistant Examiner—Alexander G. Ghyka
Attorney, Agent, or Firm—Lorraine S. Melotik

[57] ABSTRACT

This invention is a sulfur-resistant, high surface area and temperature stabilized anatase crystal form of a mixed-oxide of titania and alumina comprising at least 40% molar amount titania. The mixed-oxide is made by co-hydrolysis of a mixture of the alkoxides of titanium and aluminum. The mixed oxide is useful as a catalyst support for treating exhaust gases generated by a diesel or gasoline internal combustion engine of automotive vehicles. The catalyst support may contain catalytic materials like precious metals.

19 Claims, 2 Drawing Sheets

HIGH SURFACE AREA, THERMALLY STABILIZED TITANIA AUTOMOTIVE CATALYST SUPPORT

TECHNICAL FIELD

This invention relates to titania stabilized with alumina to be used as a catalyst support and made by a method which includes co-hydrolysis of a mixture of an aluminum alkoxide and a titanium metal alkoxide.

BACKGROUND OF THE INVENTION

Catalysts are employed in the exhaust systems of automotive vehicles to convert carbon monoxide, hydrocarbons, and nitrogen oxides ($NO_x$) produced during engine operation into more desirable gases. Generally the catalysts include a precious metal like platinum carried on a high surface area, porous support material like alumina ($Al_2O_3$). Alumina is conventionally used as a catalyst support because it has high temperature stability. That is, it retains its pore structure and hence surface area at the high exhaust gas temperatures to which it which it may be exposed during automotive operation. High surface area and retention of pore structure is important because it allows maximum contact between the exhaust gases and a catalyst material like platinum. If the pore structure of the catalyst support material is not stable and collapses during use, the catalytic material carried on the surface of the support can become occluded within the support material so that it is no longer able to catalyze the conversion of exhaust gases.

While alumina desirably has high temperature stability, one of its deficiencies is that it is poisoned by sulfur oxides (SOx) in the exhaust gas stream. That is, the alumina reacts with oxides of sulfur like $SO_2$ and $SO_3$ to forms a sulfate, $Al_2(SO_4)_3$ which is stable at high temperatures. Formation of alumina sulfate results in a decrease in the surface area and pore volume of the alumina. Hence, poisoning of the alumina by SOx lowers the efficiency of the catalyst since less catalyst is exposed to the exhaust gases.

It is known that titania is resistant to SOx poisoning at the high operating temperatures in the automotive exhaust gas system. That is because stable sulfates of titania do not exist at these high temperatures. Two major disadvantage of using titania for a catalyst support, however, are that its anatase form which is stable at low temperatures has a low surface area (25 $m^2/g$) and also that its anatase phase is converted to extremely low surface area (1 $m^2/g$) rutile phase titania at the higher temperatures experienced in the automotive exhaust (700° C.). Hence, for several reasons titania is not generally considered suitable as an automotive exhaust gas catalyst support.

It would be desirable to develop a high surface area support for catalysts which is stable and retains it high surface structure at elevated temperatures and also is not susceptible to poisoning by SOx. The present invention provides such a support material.

DISCLOSURE OF THE INVENTION

The present invention is stabilized titania in an anatase crystal form useful as a catalyst support in automotive vehicle exhaust gas systems, the mixed oxide comprising alumina ($Al_2O_3$) and at least 40% molar amount titania ($TiO_2$) based on their total, this percentage herein meaning at least a 2:3 molar ratio of $TiO_2:Al_2O_3$. The mixed oxide is a product made by a method which comprises co-hydrolysis of a mixture of the alkoxides of aluminum and titanium.

More preferably, the method comprises the steps of dissolving alkoxides of the aluminum and zirconium metals in a solvent to form a mixture of the alkoxides; combining water with the mixture to cause co-hydrolysis of the alkoxides and form a product; drying the product to remove the water and solvent; and then heating (calcining) the dried product to an elevated temperature and for a time sufficient to form the anatase crystal form alumina-titania mixed oxides. The produce may be further heated to additionally calcine the mixed oxides. According to still another embodiment, it is a process for using the mixed oxide as a support material for catalysts such as platinum for treating internal combustion engine exhaust gases by placing the disclosed mixed oxide carrying a catalyst (either within the mixed oxide or on its surface) in an internal combustion engine exhaust gas system. It can be used in, e.g., a gasoline or diesel exhaust gas system.

In this invention we describe a method to stabilize titania by the incorporation of alumina to form an anatase crystal form of alumina-titania mixed oxides. As discussed above, high surface area alumina is readily poisoned by SOx in exhaust gases so that it loses its high surface area advantage. Titania, on the other hand, while not being susceptible to SOx poisoning at exhaust gas temperatures, has the disadvantage that it transforms into an extremely low surface area rutile form at the operating temperatures of automotive exhaust gas systems.

We have unexpectedly found that titania can be thermally stabilized when formed with alumina by co-hydrolysis from their alkoxides. Even as little at 5% alumina in the alumina/titania mixed oxide increased the surface area of the anatase mixed oxide by a factor of 4 over pure titania, and this anatase mixed oxide was stable up to at least 800° C. And, advantageously, the invention mixed oxide retains its high surface area structure at high temperatures and is resistant to sulfur poisoning. These properties makes it ideal for use as a catalyst support.

DESCRIPTION OF BEST MODE OF THE INVENTION

Figure 1:
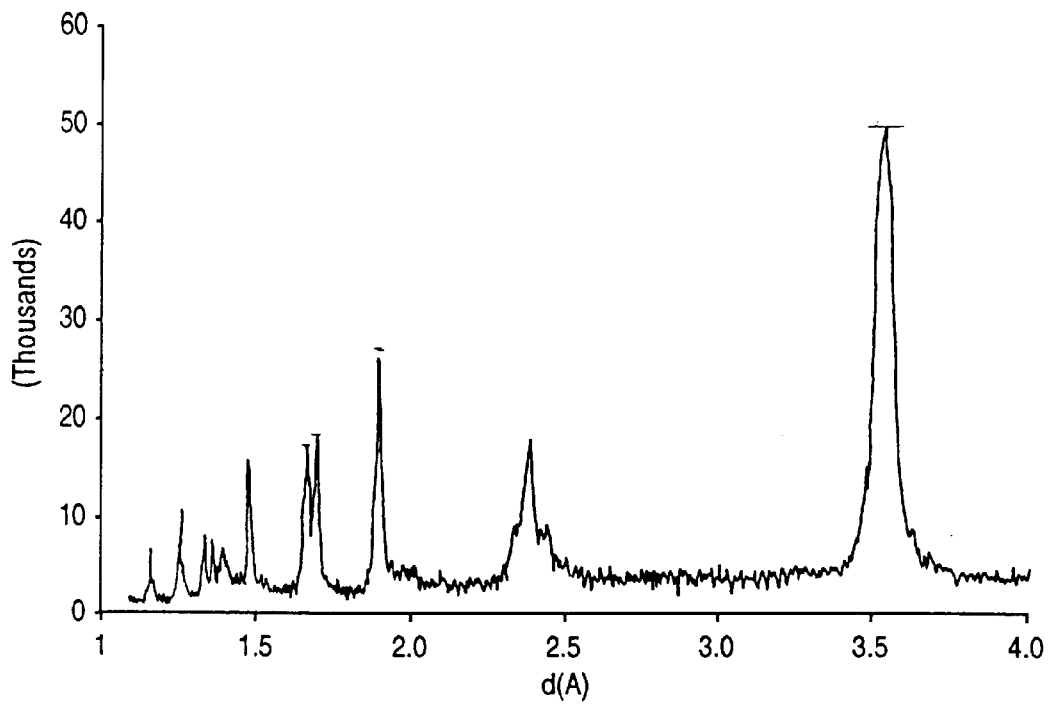
FIG. 1 is an XRD of a mixed oxide according to an embodiment of the present invention with a Al:Ti ratio of 1:1.

The present invention is a method of stabilizing titania for use as a support for catalysts for treating automotive vehicle exhaust gases. This stabilization of the titania is carried out by forming a titania/alumina mixed oxide by means of a method which comprises the co-hydrolysis of alkoxides of aluminum and titanium. The catalyst support is an anatase crystal form of the alumina/titania mixed oxides. In particular, the mixed oxides of the catalyst support include at least 40% titania.

The catalyst support is made by co-hydrolysis of the alkoxides of aluminum (Al) and titanium (Ti). The present invention metal oxides may be employed in catalyst formulations as high surface area powders on which active metals can be impregnated. According to one preferred embodiment of the present invention for making the mixed oxides, alkoxides of the aluminum and titanium metals are dissolved in a solvent to form a mixture of the alkoxides. Then the mixture is combined with water to cause co-hydrolysis of the alkoxides and form a product. The product is dried to remove the water and solvent and then the dried product is heated (calcined) at an elevated temperature and for a time sufficient to form the anatase crystal form titania/alumina mixed oxides. If desired, this mixed oxide material may be further calcined.

The alkoxide of aluminum and the alkoxide of titanium which are used to form the mixed oxides may be selected independently from, but are not limited to, alkoxides such as isopropoxide, butoxide (n-, sec-, or tert-), ethoxide, or their mixtures. Still other alkoxides useful in this invention will be apparent to those skilled in the art in view of the present disclosure. The preferred alkoxides are aluminum-tri-sec-butoxide and titanium(IV)butoxide since both are liquids and readily soluble in 2-butanol, the solvent of preferred choice.

The ratio of the alkoxides, i.e., aluminum alkoxide to titanium alkoxide is that which provides in the final product at least 40% molar amount titania, i.e., alumina comprises 60% or less of these mixed oxides considering their molar ratios. Preferably, the upper weight percent limit of titania is 95%, more preferably being 90%, and most preferably titania comprises from 40% to 90% molar amount of these mixed oxides. As discussed above, these percentages are based on the molar ratios of titania and alumina so that for example a 8:1 molar ratio of titania:alumina is considered about 89% titania in this invention. Selection of the optimal ratio of these oxides for the final product will depend on such factors as the required surface area and thermal stability characteristics desired. We unexpectedly found that even as little at 5% molar amount alumina when combined with 95% titania stabilized the titania significantly so that it stayed in its anatase crystal form and the resultant anatase crystal form alumina/titania mixed oxide had an increased surface area of a factor of 4 over that of pure titania. The anatase phase was stable up to at least 800° C. while titania itself is not at all stable at these temperatures, being present at these temperatures only in its rutile form which has extremely low surface area which precludes its effective use as a catalyst support. Additionally, this mixed oxide showed excellent sulfur poisoning resistance as compared to that of alumina itself.

Other metals may be incorporated into the oxide lattice by mixing them along with the aluminum and titanium alkoxides or in the water used for the co-hydrolysis. For example, precious metals like platinum, palladium, rhodium or iridium, useful for automotive catalytic applications may be included in the final oxides product. Generally, when such additional materials are incorporated into the alkoxide mixture, they are added as an organometallic metal. When they are added to the water of hydrolysis, they may be added as a salt of the metal, or in any form soluble in water. When included, they are generally present in an amount up to about 10 weight percent, preferably being in about 1–6 weight percent based on the weight of the mixed oxide. Thus the present invention mixed oxides comprise substantially as a base, a mixture of alumina and titania. The other materials are seen to be merely dopants to further improve physical properties such as the catalytic activity and other desirable characteristics.

The alkoxides are added into a solvent in which they are soluble such as 2-butanol. Dissolving the alkoxides in the solvent may be done at any temperature although room temperature is most convenient. The alkoxides are generally mixed into the solvent with stirring to aid their dissolution and the stirring also assures uniformity of the mixture to allow proper reaction. The mixture is then generally added to water (although the water can be added to the mixture) to induce hydrolysis. The amount of water added is optimally at least that necessary to hydrolyze all alkoxy groups. The amount of water used is generally greatly in excess of that needed to hydrolyze all the alkoxy groups. The temperature of the mixture preferably was elevated above room temperature to increase the rate of hydrolysis but optimally below the boiling point of the solvent/water. The hydrolyzed mixture is generally dried slowly with stirring to encourage the vaporization of excess water and solvent. This drying of the product is generally carried out by warming the product. After the product is dried, it is subjected to elevated temperatures sufficient to form the mixed oxides product. Subsequently, if desired, the oxide product may be further heated to calcine the mixed oxides material. Generally, the calcining temperature is at least 200° C., or in those situations where the product is to be used in automotive exhaust systems, it calcined at a temperature of at least about 500° C., similar to temperatures it will experience during use in an automotive exhaust system. The time of calcination often is at least 4 hours, although the time can vary widely. Preferably, if the oxide product is to be used in an automotive exhaust system it is calcined for about 2 to 6 hours at 600° C. to properly prepare it for use.

By using alkoxide hydrolysis techniques to make the oxide product, the resulting product has a desirably high surface area. Generally it is desirable for the product to have a surface area of at least 25 $m^2/g$, more preferably of at least 50 $m^2/g$. This surface area is optimal because it allows for high dispersion of precious metals (PM), and improves exhaust gas retention time which should result in improved interaction with PM. However these parameters of surface area are not meant to be limitations on the invention. Optimal physical parameters of the oxides product like surface area will depend on the particular intended use of the product. While a particular method for making the present invention oxide has been described in detail above, still other embodiments of alkoxide techniques may be employed as would be apparent from the present disclosure.

The ability to stabilize the titania with additions of even relatively small amounts of alumina is believed to result in part from the particular preparation technique employed, that is by formation of the mixed oxide through simultaneous co-hydrolysis of the alkoxides.

As described above, we unexpectedly found that processing from aluminum and titanium alkoxides led to mixed oxides which after drying and heating furnished high surface area, anatase phase structure alumina-titania materials. Furthermore, the materials retained this structure even after calcination at high temperatures. We believe that the special properties result because introduction of alumina into the anatase type lattice results crystalline imperfections, yielding a lower degree of crystallinity, and thus a higher surface area. While this theory has been provided, neither its understanding nor validity is necessary to the practice of the invention.

The mixed oxides of the invention can be used as supports (washcoats) to be loaded with catalytic materials like noble metals such as platinum, palladium, rhodium or mixtures thereof. These latter metals are conventionally used as three-way catalysts for treating carbon monoxide, hydrocarbons and nitrogen oxides present in internal combustion engine exhaust gases. If the product is used as a washcoat to carry catalytic materials, it may be loaded with these materials in any known way. One common way is by impregnation of the catalytic material from a solution of its soluble salt. For example, platinum is commonly impregnated from chloroplatinic acid or tetrammine platinum nitrate or organometallic platinum (Pt) compounds like Pt (dibenzylidene acetone)$_2$, and (cyclooctadienyl)$_2$PtCl$_2$. After the catalytic material is impregnated into the oxide or a slurry is formed therewith, it is generally subjected to drying and calcining. It may be applied onto usual substrates like ceramic or metallic honeycomb or cordierite monoliths. For use in automotive vehicle exhaust, it would then be placed in the vehicle catalytic converter, which during use, is subjected to exhaust gases.

The present invention mixed is considered a single-phase product and is unique in that the lattice framework includes chemical bonds between the Al—Ti—O. In contrast, a simple mixture of alumina and titania has two phases, where these bonds do not exist. Advantageously, in our single-phase material the intimate contact amongst Al, Ti and O (oxygen) by way of the chemical bonds is believed by the inventors to result in the higher thermal stability and specific surface area.

FIGS. 1 through 4 are X-ray diffraction scans of mixed oxides of some of the examples below and are discussed therein. The scans are taken with Cu K-a radiation at a scan rate of 2 degrees/min.

EXAMPLE 1

A 1:1 Al:Ti mixed oxide catalyst was synthesized in the following manner. In a drybox, 68.1 g Ti(OBu)4 [0.2M] and 49.2 g Al(OBu)3 [0.2M] were weighed out and stirred vigorously in 400 cc 2-butanol. The mixture was removed from the drybox and quickly added with stirring to 500 cc of water held just below the boiling point. The amount of water used was a 20 fold excess of that necessary to completely hydrolyze the alkoxides. The hydrolyzed mixture was slowly dried on a hotplate with stirring until it had a paste like consistency. The mixture was then placed in a drying oven overnight at 140° C. to dry out the remaining liquid. The oxide mixture was then calcined for 6 hours at 600° C. The sample was ground to pass through a 45 mesh sieve. The BET surface area, determined at liquid N$_2$ temperature, was 181 m$^2$/g. X-ray diffraction (XRD) indicated the presence of an anatase phase only, meaning that the material was all in the anatase phase.

The mixed oxide was loaded with 1% platinum by multiple impregnations with dihydrogen hexachloroplatinate. Following impregnation, the catalyst was calcined in air for 5 hours at 600° C. and then reduced in 5% H$_2$ for 3 hours at 300° C.

Tests

The catalyst was tested for the ability to reduce oxides of nitrogen under lean conditions by exposing the precious metal coated sample to a simulated diesel vehicle exhaust in a laboratory flow reactor. The platinum impregnated mixed oxide yielded a NOx conversion of 45% under highly oxidizing conditions.

EXAMPLE 2

In an analogous manner to Example 1, a 1:8 Al:Ti mixed oxide catalyst was synthesized in the following manner. 136.2 g Ti(OBu)$_4$ [0.4 M] and 12.3 g Al(OBu)$_3$ [0.05 M] were stirred in 400 cc 2-butanol and hydrolyzed in 630 cc of water. The workup was identical to the 1st example with a 6 hour, 600° C. calcination. The BET surface area, determined at liquid N$_2$ temperature, was 121 m$^2$/g. X-ray diffraction detected the presence of an anatase phase only, as in Example 1.

The mixed oxide was loaded with 1% platinum by multiple impregnations with dihydrogen hexachloroplatinate. Following impregnation, the catalyst was calcined in air for 5 hours at 600° C. and then reduced in 5% H$_2$ for 3 hours at 300° C.

The platinum impregnated mixed oxide was tested for NOx reduction activity in a simulated diesel exhaust stream and yielded a NOx conversion of 43% under highly oxidizing conditions.

EXAMPLE 3

Figure 3:
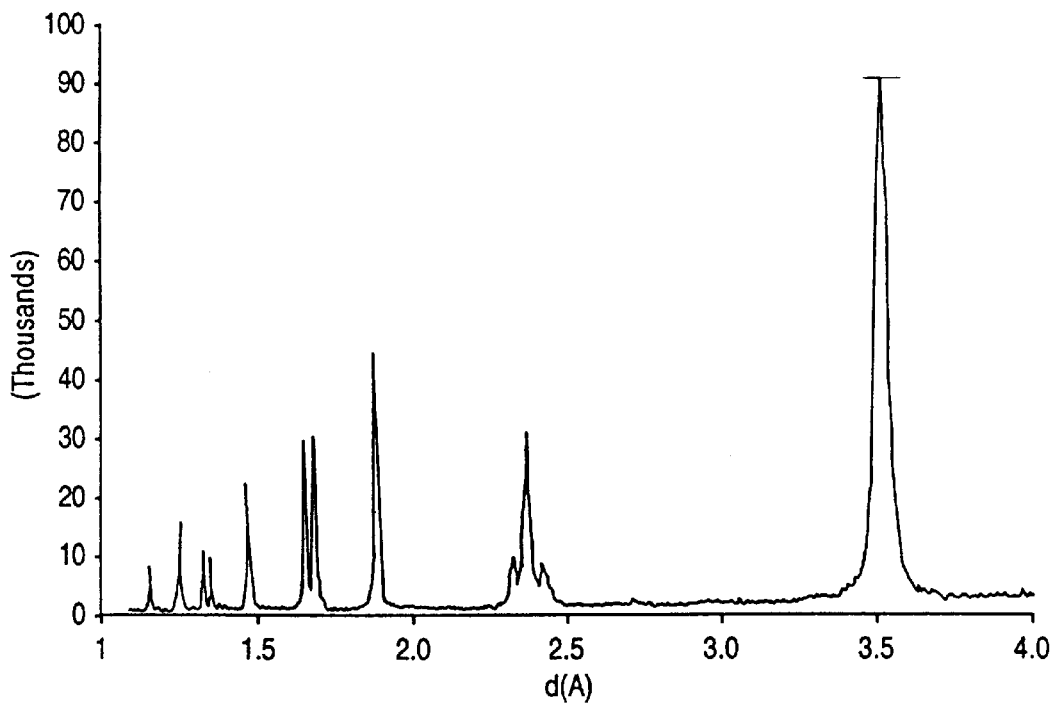
FIG. 3 is an XRD of a mixed oxide according to an embodiment of the present invention with a Al:Ti ratio of 1:8.
Figure 4:
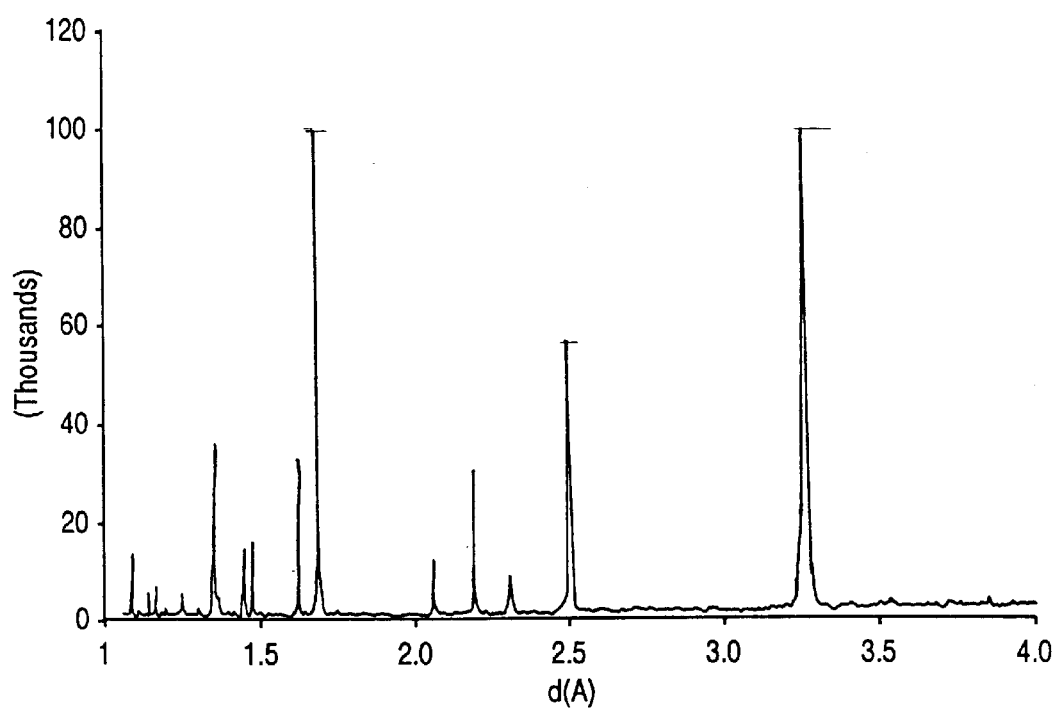
FIG. 4 is an XRD of a comparative example of an oxide with a Al:Ti ratio of 0:1, i.e. pure titania, not according to the present invention.

A sample identical to that in Example 2 (Al:Ti=1:8) was prepared, with the sole difference that it was calcined for 6 hours at 600° C. and then further calcined for 6 hours at 800° C. The BET area was 47 m$^2$/g. X-ray diffraction detected the presence of only an anatase phase (FIG. 3). That is, the peaks observed are attributable to anatase phase titania. This was in contrast to a 0:1 sample, calcined in the same manner which exhibited a XRD indicating the presence of only a rutile structure (FIG. 4), i.e., the peaks observed are attributable to rutile phase titania. Based on these XRD results, the introduction of 5% alumina into the oxide results in a stabilization of anatase lacking in the pure titania sample.

EXAMPLE 4

A sample identical to that in Example 1 (Al:Ti=1:1) was prepared, with the sole difference that it was calcined for 6 hours at 600° C. and then further calcined for 6 hours at 800° C. The BET area was 92 m$^2$/g. X-ray diffraction (FIG. 1) detected the presence of an anatase phase titania only.

The mixed oxide was loaded with 1% platinum by multiple impregnations with dihydrogen hexachloroplatinate. Following impregnation, the catalyst was calcined in air for 5 hours at 600° C. and then reduced in 5% H$_2$.

EXAMPLE 5

Figure 2:
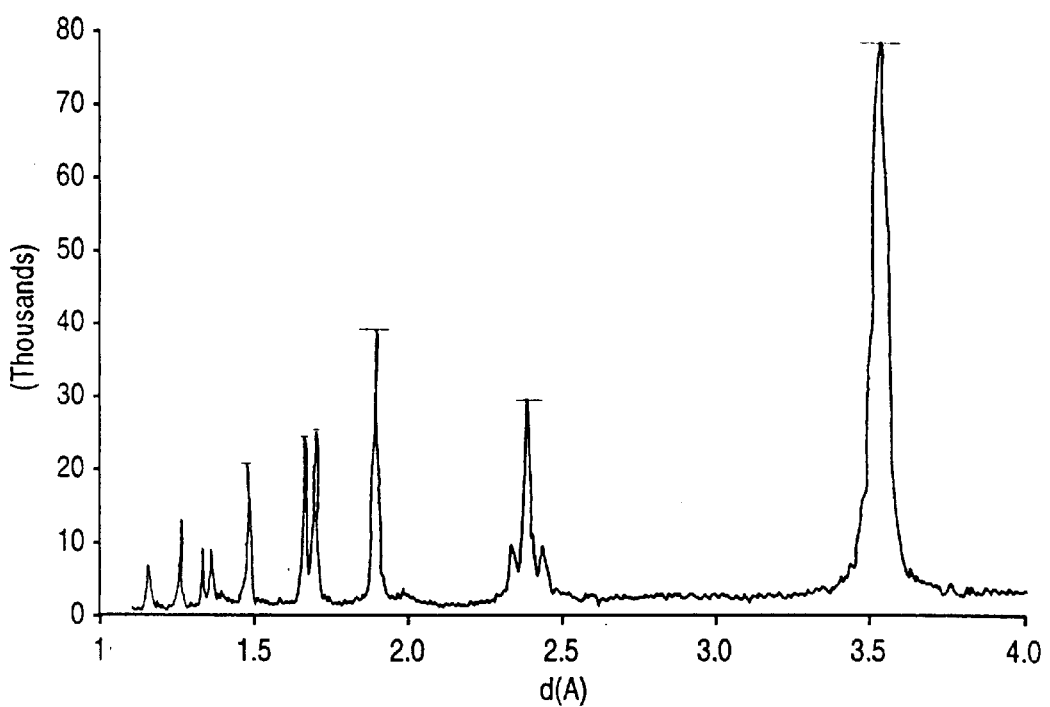
FIG. 2 is an XRD of a mixed oxide according to an embodiment of the present invention with a Al:Ti ratio of 1:3.

A 1:3 Al:Ti mixed oxide catalyst was synthesized in the following manner. 102.2 g Ti(OBu)$_4$ and 24.6 g Al(OBu)$_3$ were stirred in 400 cc 2-butanol and hydrolyzed in 540 cc of water. The workup is identical to Example 3, with a 6 hour, 600° C. calcination followed by a 6 hour 800° C. calcination. The surface area, determined at liquid N$_2$ temperature, was determined to be 69 m$^2$/g. X-ray diffraction detected the presence of an anatase phase titania only (FIG. 2).

The mixed oxide is loaded with 1% palladium by multiple impregnations with palladium nitrate. Following impregnation, the catalyst is calcined in air for 5 hours at 600° C. and then reduced in 5% H$_2$.

We claim:

1. A single-layer catalyst support of a single-phase mixed oxide of titania stabilized with alumina in an anatase crystal form, the single-phase mixed oxide comprising at least 40% molar amount titania based on the total of titania and alumina, said mixed oxide being the reaction product of a process which comprises co-hydrolysis of a mixture of alkoxides of titanium and aluminum.

2. The mixed oxides according to claim 1 wherein said alkoxide is selected from the group consisting of isopropoxide, isoproxide isoproponolate, ethoxide and butoxide.

3. The mixed oxides according to claim 1 wherein said titania comprises from 40% and up to 95% molar amount of titania+alumina.

4. The mixed oxides according to claim 3 wherein said titania comprises between about 40% and 90% molar amount of titania+alumina.

5. The mixed oxides according to claim 1 which further comprises less than 10% weight based on the total weight of titania+alumina of a material selected from the group consisting of platinum, palladium, rhodium iridium and mixtures thereof carried within or on the surface of the mixed oxides.

6. The mixed oxides according to claim 1 wherein the co-hydrolysis comprises:

dissolving said alkoxides in a solvent to form a mixture;

combining the mixture with water to cause hydrolysis of said alkoxides to form a product;

drying said product to remove water and solvent; and heating the dried product to an elevated temperature and for a time sufficient to form said anatase crystal form mixed oxides.

7. The mixed oxides according to claim 6 wherein said elevated temperature is at least 200° C.

8. The mixed oxides according to claim 1 wherein said mixed oxides have a surface area of at least 30 $m^2/g$.

9. The mixed oxides according to claim 8 wherein said mixed oxides have a surface area of at least 50 $m^2/g$.

10. A process for using a single-layer catalyst support of a single-phase mixed oxide of titania and alumina in an automotive exhaust gas system, which process comprises:

placing in said exhaust gas system a single-phase mixed oxide in an anatase crystal form as a single-layer catalyst support and comprising titania stabilized with alumina, the mixed oxide comprising at least 40% molar amount titania based on the total of titania and alumina, wherein said mixed oxide is the reaction product of a process which comprises co-hydrolyzing a mixture of alkoxides of titanium and aluminum.

11. The process according to claim 10 which further comprises providing precious metal selected from the group consisting of platinum, palladium, rhodium, iridium and mixtures thereof onto the surface of or within the mixed oxide support.

12. The process according to claim 10 wherein said alkoxide is selected from the group consisting of isopropoxide, ethoxide and butoxide.

13. The process according to claim 10 wherein said titania comprises at least 40% and up to 95% molar amount of titania+alumina.

14. The process according to claim 13 wherein said titania comprises between about 40% and 90% molar amount titania.

15. The process according to claim 10 wherein the co-hydrolysis comprises:

dissolving said alkoxides in a solvent to form a mixture;

combining the mixture with water to cause hydrolysis of said alkoxides to form a product;

drying said product to remove water and solvent; and heating the dried product to an elevated temperature and for a time sufficient to form said anatase crystal form alumina-titania mixed oxides.

16. The process according to claim 15 wherein said elevated temperature is at least 200° C.

17. The process according to claim 15 which further comprises mixing compounds of precious metal selected from; the group consisting of platinum, palladium, rhodium, iridium and mixtures thereof into said mixture.

18. The process according to claim 15 which further comprises loading precious metal selected from the group consisting of platinum, palladium, rhodium, iridium, and mixtures thereof on the surface of said mixed oxide.

19. The process according to claim 10 wherein said mixed oxides have a surface area of at least 30 $m^2/g$.

* * * * *